United States Patent [19]

Melkonian

[11] 4,054,459
[45] Oct. 18, 1977

[54] METHOD OF PREPARING GLASS BATCH

[76] Inventor: Garegin Sarkisovich Melkonian, ulitsa Barekamutiana, 26, kv. 11, Erevan, U.S.S.R.

[21] Appl. No.: 633,385

[22] Filed: Nov. 19, 1975

Related U.S. Application Data

[63] Continuation of Ser. No. 426,241, Feb. 19, 1973, abandoned.

[51] Int. Cl.$^2$ .............................................. C03C 3/04
[52] U.S. Cl. ..................................................... 106/52
[58] Field of Search ........................................ 106/52

[56] References Cited

U.S. PATENT DOCUMENTS

| 3,065,089 | 11/1962 | Hustinx | 106/52 |
| 3,759,683 | 9/1973 | Dislich et al. | 106/52 X |
| 3,791,808 | 2/1974 | Thomas | 106/52 X |

OTHER PUBLICATIONS

Optical Minerology, 3rd Ed., Kerr McGraw Hill, 1959, p. 420.

*Primary Examiner*—Patrick P. Garvin
*Assistant Examiner*—William G. Wright

[57] ABSTRACT

To prepare a glass batch use is made of aqueous solutions of bivalent metals or monovalent and bivalent metals as the starting materials and the pulp obtained on mixing thereof is dried and simultaneously granulated at a temperature of 150°–500° C. The batch is intended for the production of colorless silicate glass.

3 Claims, No Drawings

METHOD OF PREPARING GLASS BATCH

This application is a continuation of Ser. No. 426,241, filed Feb. 19, 1973, now abandoned.

The present invention relates to a method of preparing a glass batch for the manufacture of colorless silicate glass widely used in glazing buildings and in the production of variety glassware.

A method of preparing a glass batch based on such natural materials as quartz sand, dolomite, soda, potash, alumina, etc., is known. The batch ingredients are preliminarily prepared by washing with water and acids and by magnetic separation and by other processes to remove deleterious impurities ($Fe_2O_3$, FeO, $TiO_2$, $Cr_2O_3$ and other). The thus prepared batch ingredients are then dried and in a dry state mixed in mixers to produce a homogeneous mixture — the batch.

The known method of the preliminary preparation of the starting materials and preparing a mixture thereof does not provide the homogeneity of the batch obtained, as the physicochemical properties (specific gravity, melting point) of the batch-forming natural ingredients are different which results in demixing of the batch during transportation to glass furnaces and in the process of glass melting.

The high viscosity of the glass melt caused by the heterogeneity of the glass batch markedly impedes the process of glass melting.

Besides, the known method does not provide complete removal of deleterious impurities from the starting natural materials forming the glass batch which substantially lowers the quality of the glass produced from this batch.

One of the disadvantages inherent in the dry method of preparing the glass batch is that the interacting of the ingredients on the silicate- and glass-forming steps takes place in solid phases which markedly increases the time of the glass melting process.

It is an object of the present invention to eliminate the aforementioned disadvantages.

It is a further and more specific object of the present invention to provide a method for preparing a glass batch wherein use is made of ingredients and procedures assuring homogeneity of the batch obtained and complete removal of deleterious impurities therefrom which would make it possible to attain stability in the glass melting process and manufacture of high-quality glass.

It is an object of the present invention to provide a method of preparing a glass batch wherein use is made of ingredients and techniques assuring homogeneity of the batch obtained and a complete removal of deleterious impurities therefrom, thus making it possible to attain stability in the glass melting process and manufacture of high quality glass.

This and other objects have been accomplished by a method wherein to prepare a glass batch for colorless silicate glass by preliminarily preparing the starting materials and mixing the same, according to the invention, the starting materials are aqueous solutions of silicates of bivalent or monovalent and bivalent metals and the pulp (suspension) obtained on mixing thereof is dried and simultaneously granulated at a temperature of 150°–500° C. In preparing a batch for a sodium-calcium-magnesium glass it is advantageous to use as silicates of monovalent and bivalent metals, sodium the silicate and high-modulus calcium and magnesium silicates and to heat the pulp obtained to a temperature of 100°–180° C prior to drying and granulating.

For preparing a batch for potassium-lead glass it is expedient to use water potash glass and high-modulus lead silicate as the silicates of monovalent and bivalent metals, and to heat the pulp obtained to a temperature of up to 100° C.

While mixing the silicates of bivalent or monovalent and bivalent metals it is advantageous to add metal oxides to the aqueous medium according to the desired glass composition.

The nature of the present invention consists in the change of the conventional practice of dry mixing of the starting batch-forming ingredients to mixing solutions or suspensions thereof with subsequent heating of the mixtures obtained to provide silicate-forming conditions and structural transformations of the compounds formed in the process. The process of mixing the batch ingredients in an aqueous medium and hydrothermal treatment of the mixture results in a chemical reaction of the batch ingredients with the formation of silicates, which aggregate in the course of drying and granulating the mixture obtained.

Thus, the hydothermal method of batch preparation provides the production of a complex high-grade raw material which we have name "Kanazit."

Kanazit unlike the mechanical mixture of ingredients (used by the conventional method of preparing the batch) comprises cemented aggregates of several silicate compounds and exhibits a number of favourable properties. Kanazit is a highly homogeneous and chemically pure material capable of being directly employed in glass manufacture and not requiring any addition of glass-forming ingredients.

In general form for alkaline glasses, kanazit may have the following formula $xR_2O.yRO.zR_2O_3.nSIO_2.mH_2O$ where $x$, $y$, $z$, $n$, $m$ are coefficients of the oxides. In case the glass batch (Kanazit) is prepared for nonalkaline glass, the starting materials are silicates of bivalent metals with the addition of pure oxides and other metals having the general formula:

$yRO.xR_2O_3.nSiO_2.mH_2O$

Starting materials to synthesize Kanazit for a colorless glass are silicates of monovalent and bivalent elements which may be obtained by any method. These silicates as a rule, contain but a small amount of admixtures and may be employed as starting materials in the preparation of the complex raw material Kanazit.

The present method of producing a glass batch is most effective if the silicates used as prepared by the method described in our previous application wherein the silicates of alkaline and alkali-earth metals are prepared from perlites.

The silicates of alkali metals ($Na_2O.3SiO_2$) ($Na_2OSiO_2$) obtained by hydrothermal processing of perlite are almost free of deleterious impurities ($Fe_2O_3$, $TiO_2$ — is contained therein only in thousandth parts of a percent) as on filtering the pulp, the admixtures obtained in the hydrothermal treatment of perlite remain in the residue (in the alkaline hydroalumosilicates) and the filtrate obtained (silicate solutions) is sufficiently pure.

The silicates of alkaline earth metals are produced by causticization of pure clarified silicate alkaline solutions, preliminarily purified solutions of calcium hydroxide, magnesium hydroxide, etc., and therefore the thus produced alkaline earth metals are also sufficiently pure. As compared to the conventional batch, the process of melting Kanazit is preformed at lower temperature (150°-250° C) and is featured by stability, the productivity of glass furnaces is increased and high-quality glass is produced.

All this may be attributed to the chemical and physical homogeneity of kanazit, as well as to the fact that a complete silicate formation is attained already in the process of preparation.

For a better understanding of the present invention by those skilled in the art the following examples for producing a glass batch (Kanazit) are given by way of illustration.

Table 1 presents the chemical compsition of the starting materials employed for the production of kanazit of diverse compositions.

duce 10 kg of MgO into the composition, which corresponds to 21.2kg of MgO.SiO$_2$.

3. Determining the quantity of SiO$_2$ for 100 kg of glass.

With 20.0 kg of CaO 3SiO$_2$ and 21.2 kg of MgOSiO$_2$ there were introduced into the batch a total of 26.2 kg of SiO$_2$.

The remaining quantity of SiO$_2$ 54-26.2 = 27.8 kg of SiO$_2$ was added as an amorphous silica.

4. The amount of aluminum hydroxide Al(OH)$_3$ was determined by the reaction 2Al(OH)$_3 \rightarrow$ Al$_2$O$_3$ + 2H$_2$O and equals 24.7 kg.

Thus, to obtain 100 kg of the prescribed glass composition it is necessary to mix in a tank furnished with a stirrer in an aqueous medium, 20 kg of CaO.3SiO$_2$ 21.2 kg of MgOSiO$_2$, 27.8 kg of an amorphous silica, 24.7 kg Table 1

| Starting materials | Chemical composition of starting materials |||||||  |
|---|---|---|---|---|---|---|---|---|
| | Composition of ingredients |||||||  |
| | SiO$_2$ | Al$_2$O$_3$ | CaO | MgO | Na$_2$O | K$_2$O | PbO | losses in calcination +moisture |
| Sodium trisicate g/l | 236.0 | 3.0 | — | — | 82.0 | — | — | 674 |
| Water potash glass, g/l | 140.0 | 8.0 | — | — | — | 60 | — | 792 |
| Magnesium metasilicate, calculated as dry, wt.% | 40.0<br>52.8 | —<br>— | —<br>— | 36.0<br>47.2 | —<br>— | —<br>— | —<br>— | 24.0<br>— |
| Calcium metasilicate calculated as dry, wt.% | 45.0<br>54.2 | —<br>— | 38.0<br>45.8 | —<br>— | —<br>— | —<br>— | —<br>— | 17.0<br>— |
| Calcium tri-silicate calculated as dry, wt.% | 60.3<br>75.0 | —<br>— | 20.5<br>25.0 | —<br>— | —<br>— | —<br>— | —<br>— | 19.2<br>— |
| High-modulus lead silicate | 21.3 | — | — | — | — | — | 24 | 54.7 |
| 1 | 2 | 3 | 4 | 5 | 6 | 7 | 8 | 9 |
| calculated as dry, wt.% | 47.0 | — | — | — | — | — | 53 | — |
| Amorphous silica calculated as dry, wt.% | 90.5<br>99.9 | 0.1<br>0.11 | —<br>— | —<br>— | 0.2<br>0.22 | —<br>— | —<br>— | 9.4<br>— |
| alumina tri-hydrate, wt.% | — | 34.6 | — | — | — | — | — | 65.4 |

EXAMPLE 1

Production of Kanazit for a nonalkaline colorless silicate glass

If use is made of the silicates of bivalent metals with an addition of an oxide of other metals, the prescribed glass composition is (% by weight).

| SiO$_2$ | CaO | MgO | B$_2$O$_3$ | Al$_2$O$_3$ |
|---|---|---|---|---|
| 54 | 5.0 | 10.0 | 10.0 | 21.0 |

In a tank furnished with a stirrer the starting silicates of bivalent metals are stirred continuously in an aqueous medium and oxides of other metals are then added.

1. Determining the quantity of high modulus calcium silicate required for 100 kg of glass.

For 100 kg of glass according to the analysis of the prescribed composition 5.0 kg of CaO are required which were introduced into the composition in the form of calcium trisilicate taken in an amount of 20.0 kg.

2. Determining the quantity of magnesium metasilicate required for 100 kg of glass. It is necessary to introof Al(OH)$_3$ and 10 kg of B$_2$O$_3$ and the pulp, heated to a temperature of 80°-100° C, it passed to a spray dryer to be dried and granulated.

EXAMPLE 2

The case when use is made of silicates of monovalent and bivalent metals with the addition of oxides of other metals.

The prescribed glass composition (% by weight)

| SiO$_2$ | Al$_2$O$_3$ | MgO | CaO | Na$_2$O |
|---|---|---|---|---|
| 74 | 1.5 | 3.5 | 6 | 15 |

1. Determining the quantity of water glass. The source of alkali is sodium trisilicate. Determining the quantity of water glass required for the production of 100 kg of glass (R$_2$O — 15 kg).

This amounts to 18.3 l of water glass (in solution) 18.31 of water glass contain: Na$_2$O — 15 kg, SiO$_2$ — 43.2 kg, Al$_2$O$_3$ — 1.46 kg.

2. Determining the quantity of magnesium metasilicte (3.5 kg per 100 kg of glass). It amounts to 7.52 kg; 7.42 kg of magnesium metasilicate contain: MgO — 3.5 kg, SiO₂ — 3.92 kg.

3. Determining the quantity of calcium trisilicate (6 kg of CaO per 100 kg of glass). It amounts to 24 kg. 24 kg of calcium trisilicate contain: CaO — 6 kg, SiO₂— 18 kg.

4. Determining the quantity of SiO₂. The required 74 kg of SiO₂ are introduced with water glass in an amount of 43.2 kg, with magnesium metasilicate in an amount of 3.92 kg with calcium triisilicate in an amount of 18 kg, which totals 43.2 + 3.92 + 18 = 65.12 kg of SiO₂.

The lacking amount of silica is made up by amorphous pure silica.

Consumption of starting materials per 100 kg of glass is given in Table 2.

Table 2

| Starting materials | quantity in kg | Ingredients in kg | | | | |
|---|---|---|---|---|---|---|
| | | SiO₂ | Al₂O₃ | CaO | MgO | Na₂O |
| Sodium trisilicate sp.gr.1,23, calculated as dry | 60.05 | 43.2 | 1.46 | — | — | 15 |
| Magnesium metasilicate | 7.42 | 3.92 | — | — | — | 3.5 |
| Calcium trisilicate | 24.0 | 18.0 | — | 6.0 | — | — |
| Amorphous silica | 8.88 | 8.88 | — | — | — | — |
| Total | 100.0 | 74.0 | 1.46 | 6.0 | 3.5 | 15 |

Thus to obtain 100 kg of Kanazit of the prescribed glass composition it is necessary to stir continuously in a tank furnished with a stirrer a mixture of 18.3 l of sodium trisilicate, 7.42 kg of magnesium metasilicate (dry), 24 kg of calcium trisilicate (dry) and 8.88 kg of amorphous silica (dry) and to heat the mixture to a temperature of 100°-180° for 30 minutes and the pulp thus obtained is dried and granulated in a spray drier.

EXAMPLE 3

The case when use is made of a high-modulus lead silicate and silicates of monovalent metals and silicates of monovalent metals with the addition of oxides of other metals.

The desired glass composition is as follows (% by weight)

| SiO₂ | PbO | K₂O | B₂O₃ | ZnO | the rest |
|---|---|---|---|---|---|
| 57.5 | 24 | 15.5 | 1.0 | 1 | 1 |

1. Determining the quantity of water potash glass. 25.83 l of water glass contain: K₂O—1.55 kg, SiO₂—36.2 kg and Al₂O₃ — 2.1 kg.

2. Determining the quanity of a high-modulus lead silicate.

24 kg of PbO are required for 100 kg of glass. 100 kg of high-modulus lead silicate with a moisture content of 54.7% contain PbO—24 kg, SiO₂—21.3 kg; it means that it is necessary to take 100 kg of moist lead silicate.

Thus, to obtain 100 kg of Kanazit of the composition of the prescribed glass it is necessary to stir continuously in a tank furnished with a stirrer a mixture of 25.83 of water potash glass, 100 kg of a high-modulus lead silicate with a 54.7% moisture content, 1 kg of zinc oxide and 1 kg of boric anhydride and then subject the mixture to hydrothermal treatment at a temperature of 95°-100° C for 30 minutes, whereupon the pulp obtained is dried and granulated in a spray drier.

We claim:

1. A method for preparing a glass batch for colorless silicate glass comprising the steps of
    a. subjecting perlite to hydrothermal alkaline treatment and filtering to produce an aqueous solution of sodium trisilicate;
    b. mixing a part of the sodium trisilicate solution prepared in step (a) with a bivalent or trivalent metal oxide or hydroxide to form a precipitate of the silicate of said bivalent or trivalent metal and filtering to form a filtrate containing aqueous sodium hydroxide;
    c. mixing another part of the sodium trisilicate solution from step (a) with the metal silicate precipitate from step (b); and
    d. drying and simultaneously granulating the mixture from step (c) at a temperature of from 150° to 500° C. to form a cemented aggregate product, wherein the proportions of sodium trisilicate and bivalent or trivalent metal silicate used in step (c) are determined by the desired composition of the glass.

2. The method of claim 1 wherein for the manufacture of sodium- calciumm- magnesium glass, said metal silicate precipitate in step (c) consists of high-modulus calcium and magnesium silicates and the mixing in step (c) is heated to a temperature of from 100° to 180° C. prior to step (d).

3. The method of claim 1 wherein the aqueous sodium hydroxide formed in step (b) is recycled for use in step (a).

* * * * *